RADIO SELECTOR SWITCH AND DIAL MECHANISM

Filed Sept. 3, 1948 2 SHEETS—SHEET 1

INVENTOR.
William P. Lear
BY
Howard S. Klumfeld
Att'y

RADIO SELECTOR SWITCH AND DIAL MECHANISM

Filed Sept. 3, 1948 2 SHEETS—SHEET 2

INVENTOR.
William P. Lear
BY
[signature]
Att'y

Patented Jan. 6, 1953 2,624,835

UNITED STATES PATENT OFFICE 2,624,835

RADIO SELECTOR SWITCH AND DIAL MECHANISM

William Powell Lear, Santa Monica, Calif., assignor to Lear, Incorporated, Grand Rapids, Mich., a corporation of Illinois Application September 3, 1948, Serial No. 47,624

5 Claims. (Cl. 250—16)

This invention relates to a combined function selector switch and tuning mechanism for a radio receiver or similar instrument.

For certain types of multi-band radio receivers, for example, as used in aircraft, there has been provided a band selector switch and a function selector switch, each independently operable by separate knobs or the like. The function selector switch may be used for switching between antennas, for voice reception, radio ranging and other uses, and all or certain ones of these functions are desirable on one or more bands and not on others. However, it is desirable that the two knobs or handles previously required be combined into a single control, particularly in radio equipment intended for use aboard aircraft. It will be recognized that minimizing of the number of separate controls is a desirable objective in any type of apparatus, and especially so for an airplane pilot, whose task is complicated to a degree in the primary manipulation of the craft. Moreover, since it is possible to so arrange the receiver that certain functions be associated with certain bands and not others, the element of automatism inherent in single-knob control is a decided advantage.

Accordingly the primary object of my invention is to provide in a radio equipment means for selecting a desired frequency band, together with means for selection of functions while operating within one or more specific bands, said band- and function-selecting operations being operable by a single handle or knob.

Another object is to provide combined means as aforesaid which includes devices for accurately positioning the movable parts and for preventing inadvertent dislodgment thereof from a selected position.

Generally the invention comprises a selector switch for modifying the circuitry of the apparatus to enable it to respond to one of a plurality of frequency bands of the operator's selection, the switch including contacts for maintaining operation in the selected band while inserting or removing other components in and from the circuit. Means are provided for manipulating a shutter juxtaposed to the tuning dial for exposing graduations on the dial corresponding to the selected frequency band, these means being cojointly operable with the band selector switch. Rotation of the tuning dial and tuning means, e. g. variable condensers, is by means of one knob, and operation of the remaining described mechanism by a second knob.

In the drawings which show one preferred mode of embodying the invention in practice:

Figs. 9 to 14 inclusive are diagrammatic views evidencing the operation of the invention.

Figure 1:
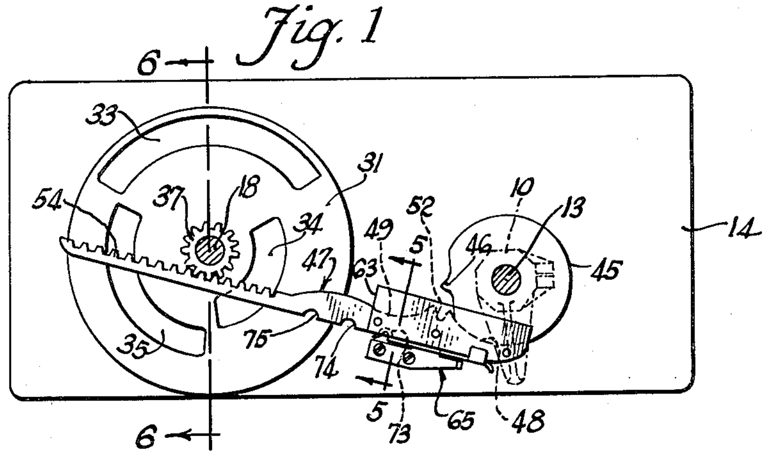
Fig. 1 is a front elevational view of the receiver with the front escutcheon plate removed.
Figure 2:
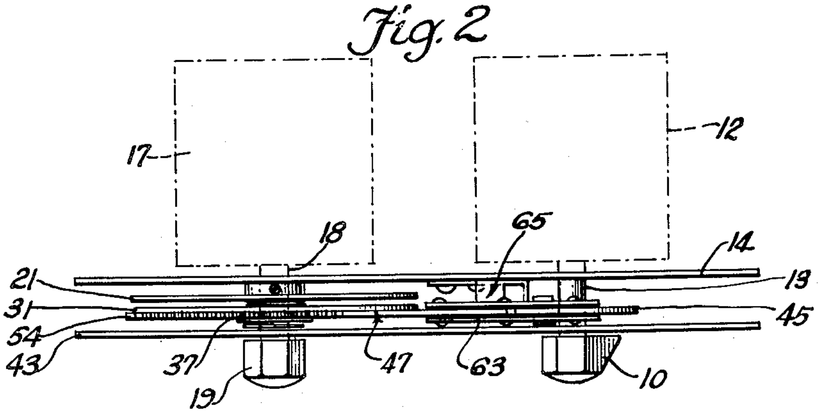
Fig. 2 is a plan view of the receiver showing those parts thereof embodying the invention, some cooperating parts in phantom, and other inconsequential parts eliminated.
Figure 3:
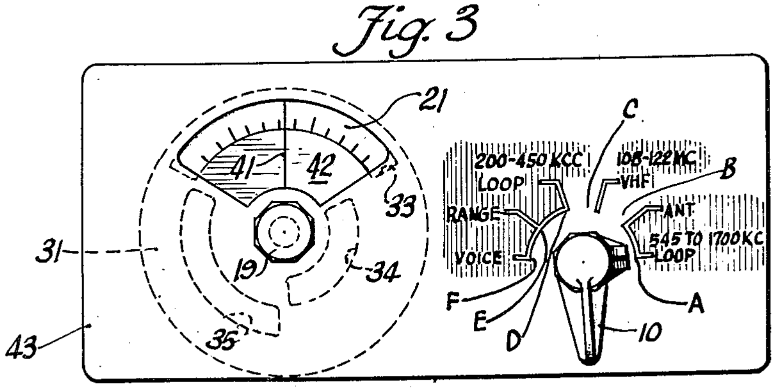
Fig. 3 is a view similar to Fig. 1 but with the front escutcheon plate in place.

Turning first to Figs. 1, 2 and 3 there is shown, by way of example, a radio receiver adapted for radio direction finding as well as conventional radio reception. One form of radio direction finding apparatus to which such receiver is adaptable includes a rotatable loop antenna for sensing the direction of the transmitted signal upon which a bearing is based and a fixed antenna for resolution of signal ambiguity, as is well-known. Moreover, the apparatus is indicated as capable of use as a range receiver in the beacon band, for reception of very high frequencies, and for ordinary broadcast reception.

Function selection is obtained by means of a handle 10 operable to six positions as shown in Fig. 3. For convenience these are designated as A, B, C, D, E and F reading counterclockwise, although it will be understood from what follows that the number of functions is not limited to six, but may be more or less, and in any desired grouping.

At position A the receiver is set to the rotatable loop of the aircraft and in position B to the fixed antenna, tuning being accomplished on either position within the band of 545 to 1700 kilocycles.

At position C the receiver is connected to an antenna for receiving very high frequencies and tuning is accomplished in the band of 108 to 122 megacycles.

At position D the receiver is set to the loop, at E to marker beacon range finding, and at F to voice reception, all three operable selectively in the band of 200 to 450 kilocycles.

All of the foregoing is exemplificative only.

Modifications in the receiver circuitry are accomplished by a selector switch 12 of any desired type, e. g. a wafer switch, the several rotatable positions thereof being maintained by a ball detent device (not shown) as is well known in the art. A shaft 13 of the switch 12 carries the handle 10. Switch 12 is supported on a face plate 14, there being an aperture therein for passage of the shaft 13.

The variable condenser or equivalent device for tuning within a selected frequency band is indicated at 17, and is provided with a control shaft 18 to which is secured the knob 19 for rotation of the shaft 18 in the conventional manner.

Figure 6:
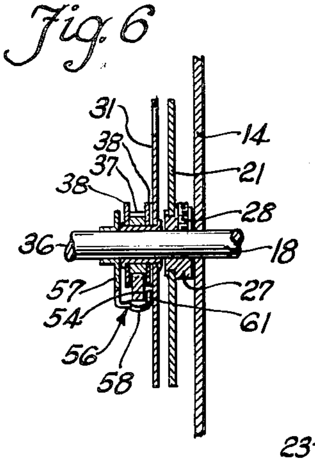
Fig. 6 is a cross sectional detail taken on the line 6—6 of Fig. 1.
Figures 7, 8:
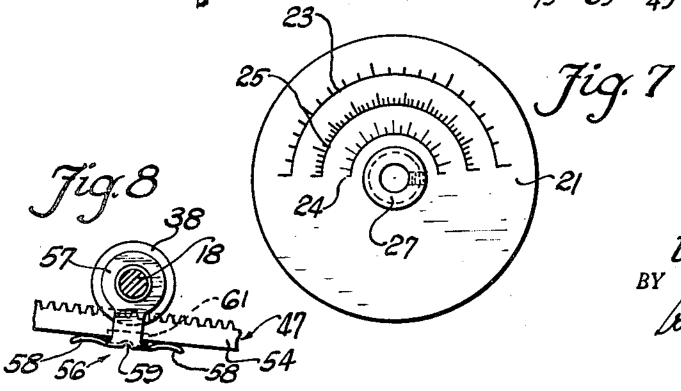
Fig. 7 is a detail of the tuning dial.
Fig. 8 is a detail view of the rack and rack retaining spring.

Since the tuning device 17 is effective on any of the bands for which the receiver is designed the dial 21 (Fig. 7) is graduated into three concentric sets of indicia 23, 24 and 25 representative of the three bands embraced in positions A and B, C and D, E and F respectively. Dial 21 is provided with a hub 27 (Fig. 6) and set screws 28 whereby attachment thereof to the shaft 18 is effected.

In order to expose only that one of the scales 23, 24 and 25 of immediate consequence a shutter 31 is provided, and comprises a thin, flat, circular member having three arcuate, concentric slots 33, 34 and 35 therethrough, each of which is adapted to be placed in register with a scale 23, 24 or 25 respectively upon appropriate partial rotation of the shutter. Shutter 31 is mounted for free rotation on the shaft 18 by a hub 36, this latter also having secured thereto a pinion 37 and pinion side plates 38—38.

The conventional fixed tuning hair line 41 is shown as part of a window 42 set into a suitable opening in the front escutcheon plate 43 which also carries the legends A to F inclusive.

Rotation of the shutter 31 to any of its three positions is through the medium of mechanism now to be described.

Affixed to the shaft 13 is a substantially circular disc 45 having a single gear tooth 46 protruding from a chordal portion thereof, the pitch circle of the tooth being coincident with the peripheral circular portion of the disc.

Coplanar with the disc 45 is the slidable member 47 including two concave edge portions 48 and 49 interrupted by a notch 52 adapted to mesh with the tooth 46. The radius of each of the portions 48 and 49 is equal to that of the disc 45 and the disc is in mutually sliding contact with one or the other during certain portions of the function cycle.

Member 47 also includes the rack 54 in mesh with the pinion 37. In order to retain these two elements in engagement there is provided (Figs. 6 and 8) a retainer 56 including an apertured ear 57, opposed resilient ears 58—58, a protuberance 59, and an upturned lip 61. Ears 58—58 press member 47 upwardly to maintain pinion 37 and rack 54 in mesh. Protuberance 59 cooperates in the maintenance of such engagement and provides a line-contact guide for the rack 54. Lip 61 and ear 57 between them guide the rack 54 laterally, the plates 38—38 assisting therein.

Figure 5:
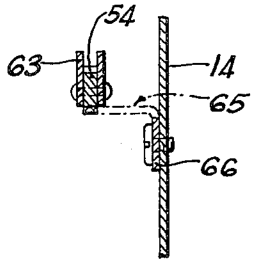
Fig. 5 is a cross sectional detail taken on the line 5—5 of Fig. 1.

To preserve alignment of the member 47 and disc 45 a U-shaped guard 63 (Figs. 1 and 5) is riveted or otherwise fastened to the member 47, the upstanding sides of the guard embracing a portion of the disc 45 in any of the operative positions of the member 47.

Figure 4:
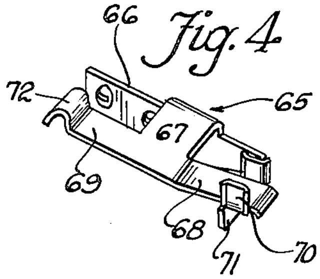
Fig. 4 is a perspective detail of the rack guide.

In order to maintain proper engagement of the edge of member 47 with the edge of disc 45 a support 65 (Figs. 1 and 4) is secured to the plate 14. Referring particularly to Fig. 4 the support 65 includes an attaching portion 66, an arm 67 and furcations 68 and 69 extending oppositely therefrom. Furcation 68 is resilient and includes a pair of upstanding lugs 70—70 adapted to guide the guard 63 therebetween. Acting as a backstop for the furcation 68 is the finger 71 formed as a continuation of the portion 66. Furcation 69 is likewise resilient and terminates in a hump or detent 72 adapted to engage and temporarily lock into any of the three notches 73, 74 or 75.

Figure 9:
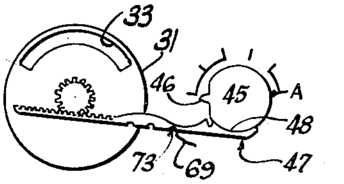

Assuming the parts to be in the position shown in Fig. 3 with the handle 10 at its extreme clockwise position, corresponding to legend A, the receiver is adjusted to receive on the "loop" in the band of 545 to 1700 kilocycles. The scale 23 will be exposed by shutter aperture 33, now in register with window 42, and the shutter-shifting mechanism is as shown in Fig. 9. A circular portion of disc 45 will be lying in concave depression 48 of member 47 thereby locking the shutter 31 in that position but permitting rotation of disc 45. Moreover detent 69 is engaged in notch 73 to insure further against accidental movement of member 47. With aperture 33 in position dial scale 23 only may be utilized in tuning by means of knob 19.

Figure 10:
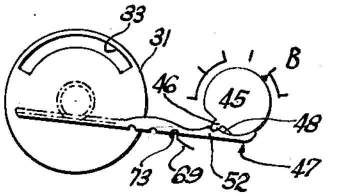

Rotation counterclockwise of handle 10 from position A to position B may occur simply by rotation of the circular portion of disc 45 within concavity 48, such movement being ineffective to actuate member 47 (Fig. 10). Tuning may be performed in the same band by means of knob 19, the switch 12 having merely modified the circuitry from "loop" to "antenna."

Figure 11:
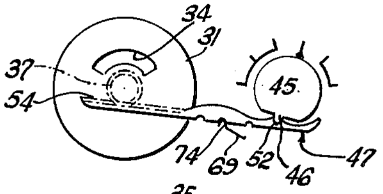
Figure 12:
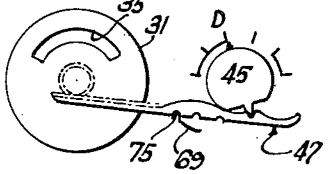

Further counterclockwise rotation of handle 10 from position B to position C engages tooth 46 with notch 52 to move switch 12 and simultaneously to actuate member 47 to the right (Fig. 11). Detent 69 is dislodged from notch 73 and will snap into notch 74. Through rack 54 and pinion 37 the shutter 31 is thus rotated to bring aperture 34 within the window 42 and in radial alignment with scale 24. Detent 69 insures accurate and positive register of aperture 34. Tuning may now be accomplished with the circuitry as modified by change in position of switch 12 and through the medium of scale 24.

Movement of switch 12 from position C to position D will cause tooth 46 to move member 47 further to the right (Fig. 12) and to shift engagement of detent 69 from notch 74 to notch 75. Simultaneously aperture 35 is brought into operative relation with scale 25.

Figure 13:
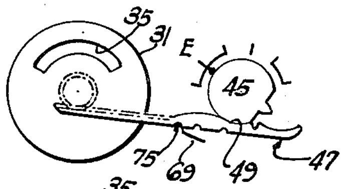
Figure 14:
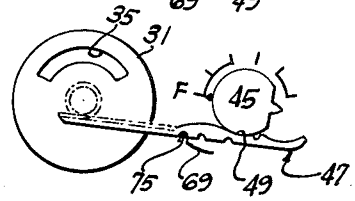

Additional counterclockwise rotation of switch 12 from position D to position E or from E to F is ineffective to operate member 47, the circular portion of disc 45 merely sliding relatively to concavity 49 (Figs. 13 and 14). Tuning may be accomplished through scale 25 on any of positions D, E or F as desired.

Step-by-movement of switch 12 in a clockwise sense constitutes merely a reversal of the sequence illustrated in Figs. 9 through 14.

From the foregoing it will have been comprehended that I have provided a simple, positive mechanism which simplifies to a great degree the selection of a desired circuit arrangement together with the desired selection of tuning scales. The construction is such as to be foolproof and reliable, both desiderata being of paramount importance in aerial navigation.

While I have shown a particular embodiment of my invention, it will be understood, of course, that I do not wish to be limited thereto since many modifications may be made, and I therefore contemplate by the appended claims to cover any such modifications as fall within the true spirit and scope of my invention.

Having thus described my invention, what I claim and desire to secure by Letters Patent is:

1. Function selecting mechanism for a radio receiver or the like comprising a first member rotatable to any position in a plurality of groups of positions, a second member rotatable to a plurality of positions equal to the number of said groups, a disc secured for rotation with said first member and having at least one tooth extending radially thereof and a circular peripheral portion, a member mounted for sliding movement relatively to said disc member and having a notch adapted to be engaged by said tooth and concavities adapted to receive said circular disc portion, and means interconnecting said second member and said sliding member, engagement of said tooth and notch upon rotation of said first member being effective to rotate said second member, and disengagement thereof permitting rotation of said first member independently of said second member.

2. Tuning and function selecting mechanism for a radio receiver or the like having a plurality of circuit components, comprising a circuit tuning device, switching means for changing the arrangement of the components to enable reception by the receiver within a selected one of a plurality of frequency bands and for selecting functions within said bands, a tuning dial associated with said device and bearing a plurality of scales, one individual to each said band, a movable shutter having a series of apertures each being adapted to expose the entire range of each of said scales singly and selectively, a function selector switch, and means interconnecting said shutter and switching means to actuate said shutter upon movement of the switching means to predetermined function positions.

3. Mechanism as in claim 2 in which said interconnecting means includes an intermittently operating linkage.

4. Mechanism as in claim 2 in which said interconnecting means includes a substantially circular disc operable with said switching means, a projection carried by said disc, a slidable member having arcuate edge portions adapted for sliding movement relatively to circular portions of said disc and a notch engageable by said projection, said member being operatively connected to said shutter.

5. Tuning and function selecting mechanism for a radio receiver or the like having a plurality of circuit components comprising a circuit tuning device, a rotatable switch for changing the arrangement of the components to enable reception by the receiver within a selected one of a plurality of frequency bands and for selecting functions within said bands, a tuning dial associated with said device and bearing a plurality of scales, one individual to each said band, a rotatable shutter having a series of apertures each adapted to expose said scales singly and selectively, a plate secured for rotation with said switch and having at least one circular peripheral portion and at least one radial tooth in axial alignment with said portion, a member mounted for sliding movement perpendicularly to the axis of said disc and having a plurality of concavities adapted to be moved into sliding engagement with said portions, each pair of concavities being interrupted by a notch adapted to be engaged by said tooth, said member carrying a rack and said shutter carrying a pinion with which said rack is in mesh.

WILLIAM POWELL LEAR.

REFERENCES CITED

The following references are of record in the file of this patent:

UNITED STATES PATENTS

| Number | Name | Date |
|---|---|---|
| 1,356,915 | Fisher | Oct. 26, 1920 |
| 1,615,041 | Ross | Jan. 18, 1927 |
| 1,619,544 | Sanford | Mar. 1, 1927 |
| 1,711,931 | Farrington | May 7, 1929 |
| 1,726,876 | Asbury | Sept. 3, 1929 |
| 1,761,211 | Jones et al. | June 3, 1930 |
| 1,807,995 | Marvel | June 2, 1931 |
| 1,833,235 | Slocumb | Nov. 24, 1931 |
| 1,958,282 | Tregenza | May 8, 1934 |
| 2,039,885 | Chum | May 5, 1936 |
| 2,118,859 | Newman | May 31, 1938 |